(12) United States Patent
Norton et al.

(10) Patent No.: US 10,576,623 B2
(45) Date of Patent: Mar. 3, 2020

(54) HYPER REDUNDANT ROBOTS

(71) Applicant: ROLLS-ROYCE plc, London (GB)

(72) Inventors: Andrew D Norton, Derby (GB);
Stewart Lowth, Nottingham (GB); Xin Dong, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/803,028

(22) Filed: Nov. 3, 2017

(65) Prior Publication Data
US 2018/0154515 A1 Jun. 7, 2018

(30) Foreign Application Priority Data
Dec. 2, 2016 (GB) .................................. 1620518.9

(51) Int. Cl.
| | |
|---|---|
| *B25J 9/06* | (2006.01) |
| *B25J 18/06* | (2006.01) |
| *B25J 17/02* | (2006.01) |
| *B25J 9/04* | (2006.01) |

(52) U.S. Cl.
CPC ........... *B25J 9/065* (2013.01); *B25J 17/0275* (2013.01); *B25J 18/06* (2013.01); *B25J 9/04* (2013.01)

(58) Field of Classification Search
CPC ..... B25J 18/06; B25J 9/04; B25J 9/065; B25J 17/0275
USPC ............................ 74/490.01, 490.04, 490.05
See application file for complete search history.

(56) References Cited

U.S. PATENT DOCUMENTS

| | | | | |
|---|---|---|---|---|
| 3,190,286 A | * | 6/1965 | Stokes | A61B 1/00165 138/120 |
| 3,266,059 A | * | 8/1966 | Stelle | B25J 9/06 138/120 |
| 3,546,961 A | * | 12/1970 | Marton | B63C 11/26 74/502.5 |
| 4,494,417 A | * | 1/1985 | Larson | B25J 9/06 74/469 |
| 4,661,039 A | * | 4/1987 | Brenholt | B25J 9/142 414/735 |

(Continued)

FOREIGN PATENT DOCUMENTS

| | | |
|---|---|---|
| EP | 3 095 564 A1 | 11/2016 |
| GB | 2537731 A | 10/2016 |

(Continued)

OTHER PUBLICATIONS

Jan. 29, 2018 Search Report issued in European Patent Application No. 17199922.0.

(Continued)

*Primary Examiner* — Victor L Macarthur
*Assistant Examiner* — T. Scott Fix
(74) *Attorney, Agent, or Firm* — Oliff PLC

(57) ABSTRACT

A hyper redundant robot comprising: a first disk; a second disk positioned adjacent to the first disk, the first disk and the second disk having a longitudinal axis; a first joint arrangement positioned between the first disk and the second disk, the first disk and/or the second disk being in sliding contact with the first joint arrangement to enable the first disk and the second disk to rotate relative to one another; and a second joint arrangement positioned between the first disk and the second disk, the second joint arrangement being less stiff than the first joint arrangement.

11 Claims, 6 Drawing Sheets

(56) References Cited

U.S. PATENT DOCUMENTS

| | | | | |
|---|---|---|---|---|
| 4,700,693 | A * | 10/1987 | Lia | A61B 1/0055 356/241.4 |
| 4,724,716 | A * | 2/1988 | Kawai | B25J 9/06 414/735 |
| 4,784,042 | A * | 11/1988 | Paynter | B25J 9/142 414/7 |
| 4,787,369 | A * | 11/1988 | Allred, III | A61B 1/0055 356/241.6 |
| 4,790,294 | A * | 12/1988 | Allred, III | A61B 1/0055 138/120 |
| 4,796,607 | A * | 1/1989 | Allred, III | A61B 1/0055 138/120 |
| 4,815,911 | A * | 3/1989 | Bengtsson | B25J 9/06 403/121 |
| 5,005,558 | A * | 4/1991 | Aomori | A61B 1/0055 600/141 |
| 5,251,538 | A * | 10/1993 | Smith | F16J 3/06 92/34 |
| 5,297,443 | A * | 3/1994 | Wentz | B25J 15/12 74/490.04 |
| 5,469,756 | A * | 11/1995 | Feiten | B25J 15/12 74/490.05 |
| 6,503,194 | B2 * | 1/2003 | Pauker | A61B 1/0055 600/146 |
| 7,090,637 | B2 * | 8/2006 | Danitz | A61B 1/0055 600/141 |
| 7,543,518 | B2 | 6/2009 | Buckingham et al. | |
| 7,828,808 | B2 * | 11/2010 | Hinman | A61B 1/008 606/1 |
| 8,069,747 | B2 * | 12/2011 | Buckingham | B25J 9/06 74/490.04 |
| 9,737,365 | B2 * | 8/2017 | Hegeman | A61B 17/320016 |
| 2005/0107667 | A1 * | 5/2005 | Danitz | A61B 1/0053 600/139 |
| 2010/0030377 | A1 * | 2/2010 | Unsworth | B25J 9/06 700/245 |
| 2011/0174108 | A1 * | 7/2011 | Graham | A61B 5/065 74/490.05 |
| 2012/0067158 | A1 | 3/2012 | Kell et al. | |
| 2012/0209253 | A1 | 8/2012 | Donhowe | |
| 2012/0232530 | A1 | 9/2012 | Main et al. | |
| 2013/0090763 | A1 * | 4/2013 | Simaan | A61B 5/11 700/258 |
| 2013/0239734 | A1 * | 9/2013 | Hinman | A61B 17/29 74/490.04 |
| 2013/0312564 | A1 * | 11/2013 | Kim | B25J 18/06 74/490.04 |
| 2014/0260755 | A1 | 9/2014 | Dong et al. | |
| 2015/0047451 | A1 * | 2/2015 | Kwon | B25J 17/00 74/490.05 |
| 2015/0164491 | A1 | 6/2015 | Choset et al. | |
| 2015/0320295 | A1 | 11/2015 | Belson et al. | |
| 2016/0008990 | A1 * | 1/2016 | Franz | A61B 1/0057 74/490.05 |
| 2016/0311108 | A1 * | 10/2016 | Alambeigi | B25J 9/06 |
| 2018/0078322 | A1 * | 3/2018 | Haraguchi | A61B 34/70 |

FOREIGN PATENT DOCUMENTS

| | | | |
|---|---|---|---|
| SU | 1414642 A1 * | 8/1988 | B25J 18/06 |
| WO | 2010/001114 A2 | 1/2010 | |
| WO | 2016/035086 A2 | 3/2016 | |

OTHER PUBLICATIONS

Jun. 1, 2017 Search Report issued in British Patent Application No. 1620518.9.

Snake-arm robots for aircraft assembly. Available: http://www.ocrobotics.com/applications-solutions/aerospace/aerospace-case-study/.

Kim et al., "A Stiffness-Adjustable Hyperredundant Manipulator Using a Variable Neutral-Line Mechanism for Minimally Invasive Surgery," Robotics, IEEE Transactions on, 2014.

Walker et al., "A novel elephant's trunk'robot," in Advanced Intelligent Mechatronics, 1999. Proceedings. 1999 IEEE/ASME International Conference on, 1999, pp. 410-415.

Shang et al., "An articulated universal joint based flexible access robot for minimally invasive surgery," in Robotics and Automation (ICRA), 2011 IEEE International Conference on, 2011, pp. 1147-1152.

Simaan et al., "A dexterous system for laryngeal surgery," in Robotics and Automation, 2004. Proceedings. ICRA'04. 2004 IEEE International Conference on, 2004, pp. 351-357.

Webster et al., "Toward active cannulas: Miniature snake-like surgical robots," in Intelligent Robots and Systems, 2006 IEEE/RSJ International Conference on, 2006, pp. 2857-2863.

Dong et al., "Design and analysis of a family of snake arm robots connected by compliant joints," Mechanism and Machine Theory, vol. 77, pp. 73-91, 2014.

Dong et al., "A Novel Continuum Robot Using Twin-Pivot Compliant Joints: Design, Modeling, and Validation," Journal of Mechanisms and Robotics, vol. 8, p. 021010, 2016.

Degani et al., "Highly articulated robotic probe for minimally invasive surgery," in Robotics and Automation, 2006. ICRA 2006. Proceedings 2006 IEEE International Conference on, 2006, pp. 4167-4172.

Simaan, "Snake-like units using flexible backbones and actuation redundancy for enhanced miniaturization," in Robotics and Automation, 2005. ICRA 2005. Proceedings of the 2005 IEEE International Conference on, 2005, pp. 3012-3017.

* cited by examiner

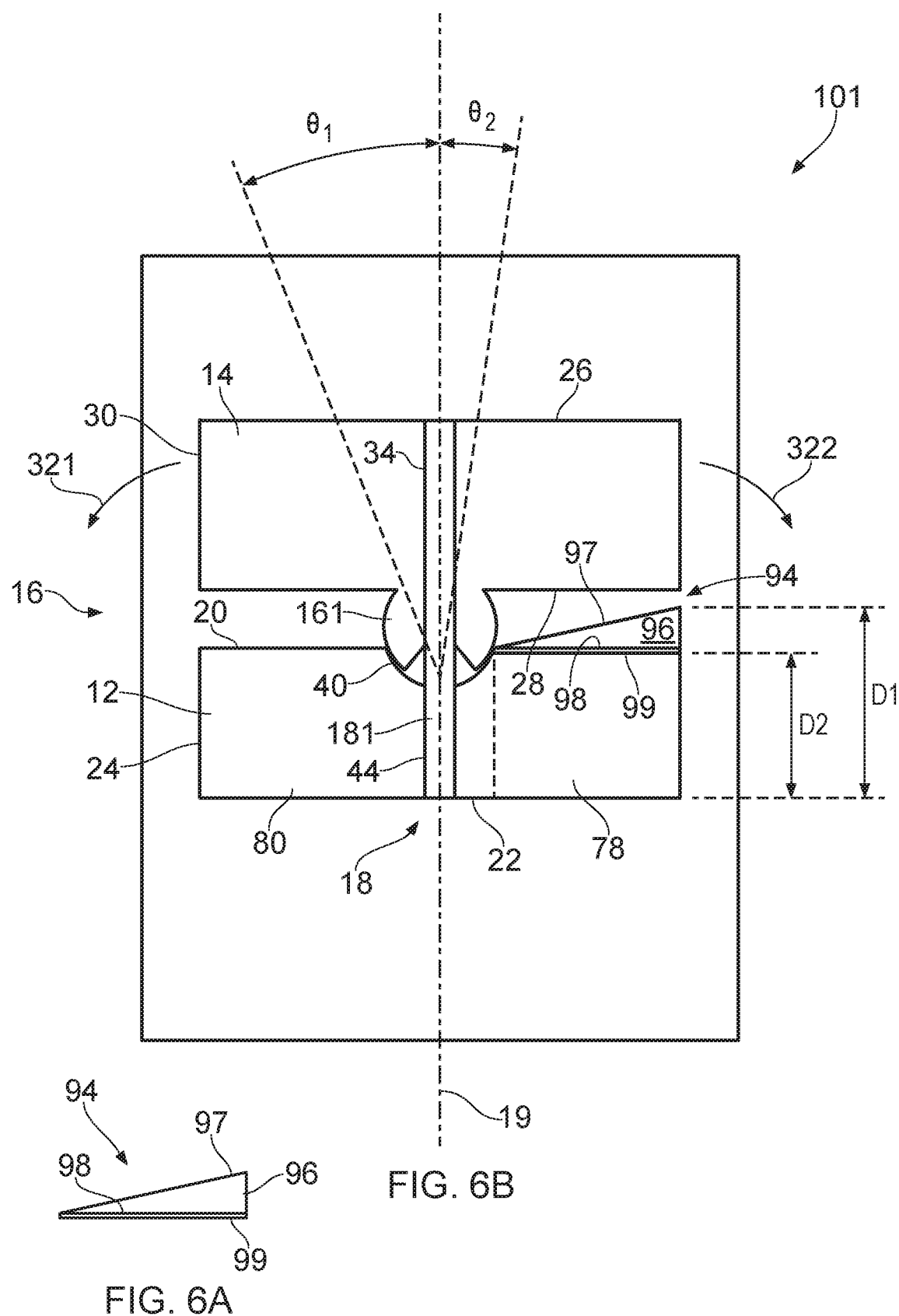

HYPER REDUNDANT ROBOTS

TECHNOLOGICAL FIELD

The present disclosure concerns hyper redundant robots.

BACKGROUND

Hyper redundant robots are robots that have a number of actuated degrees of freedom that exceed the minimal number required to perform a particular task. For example, a robot that is required to position and orient an object in space needs six actuated degrees of freedom, so a robot with seven or more degrees of freedom is redundant with respect to this task. Examples of hyper redundant robots include (but are not limited to) "snake arm" robots, "elephant trunk" robots, and "snake" robots.

Hyper redundant robots may be used in industry to perform inspection and/or repair activities on an article. For example, a hyper redundant robot may be inserted into a gas turbine engine through a borescope port or through the fan to inspect the interior of the gas turbine engine for wear and/or damage. By way of another example, a hyper redundant robot may be inserted into a gas turbine engine to carry out a repair activity on a component within the gas turbine engine (blending of a leading edge of a compressor blade for example).

BRIEF SUMMARY

According to various examples there is provided a hyper redundant robot comprising: a first disk; a second disk positioned adjacent to the first disk, the first disk and the second disk having a longitudinal axis; a first joint arrangement positioned between the first disk and the second disk, the first disk and/or the second disk being in sliding contact with the first joint arrangement to enable the first disk and the second disk to rotate relative to one another; and a second joint arrangement positioned between the first disk and the second disk, the second joint arrangement being less stiff than the first joint arrangement.

The first joint arrangement may comprise a first material and the second joint arrangement may comprise a second material. The second material may be different to the first material. The second material may have a lower modulus of elasticity than the first material.

The first joint arrangement may have a first cross sectional area and may comprise a first material. The second joint arrangement may have a second cross sectional area and comprise a second material. The second material may be different to the first material and may have a higher modulus of elasticity than the first material. The second cross sectional area may be less than the first cross sectional area.

The first material may comprise one of: a metal; a ceramic; or a plastic. The second material may comprise one of: rubber; a super elastic metal; or a plastic.

The first disk may define a first edge and the second disk may define a second edge. The first joint arrangement and the second joint arrangement may be positioned adjacent the first edge and the second edge.

The first disk may define a first aperture extending parallel to the longitudinal axis and the second disk may define a second aperture extending parallel to the longitudinal axis.

The first joint arrangement may define one or more apertures extending parallel to the longitudinal axis. The second joint arrangement may extend through the one or more apertures of the first joint arrangement.

The second joint arrangement may be positioned externally to the first joint arrangement between the first disk and the second disk.

The first disk may comprise a first portion having a depth that is greater than a depth of a remainder of the first disk to reduce the extent of rotational movement between the first disk and the second disk in a direction.

The hyper redundant robot may further comprise: a third disk; and a fourth disk positioned adjacent to the third disk. The third and fourth disks may each have a constant depth.

The hyper redundant robot may have a first free end and a second end coupled to an actuator. The first disk and the second disk may be positioned in closer proximity to the second end than the third disk and the fourth disk.

The first disk and the second disk may define a distance there between along the longitudinal axis. The hyper redundant robot may further comprise a member defining a surface including an adhesive for coupling the member to the first disk or to the second disk to reduce the extent of rotational movement between the first disk and the second disk in a direction. The depth of the member may be equal to or less than the distance between the first disk and the second disk.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 6A illustrates a schematic side view of a member for restricting rotational movement of a hyper redundant robot according to various examples; and FIG. 6B illustrates a schematic side view of the hyper redundant robot illustrated in FIG. 2 and the member illustrated in FIG. 6A.

DETAILED DESCRIPTION

In the following description, the terms 'connected' and 'coupled' mean operationally connected and coupled. It should be appreciated that there may be any number of intervening components between the mentioned features, including no intervening components.

Figure 1:
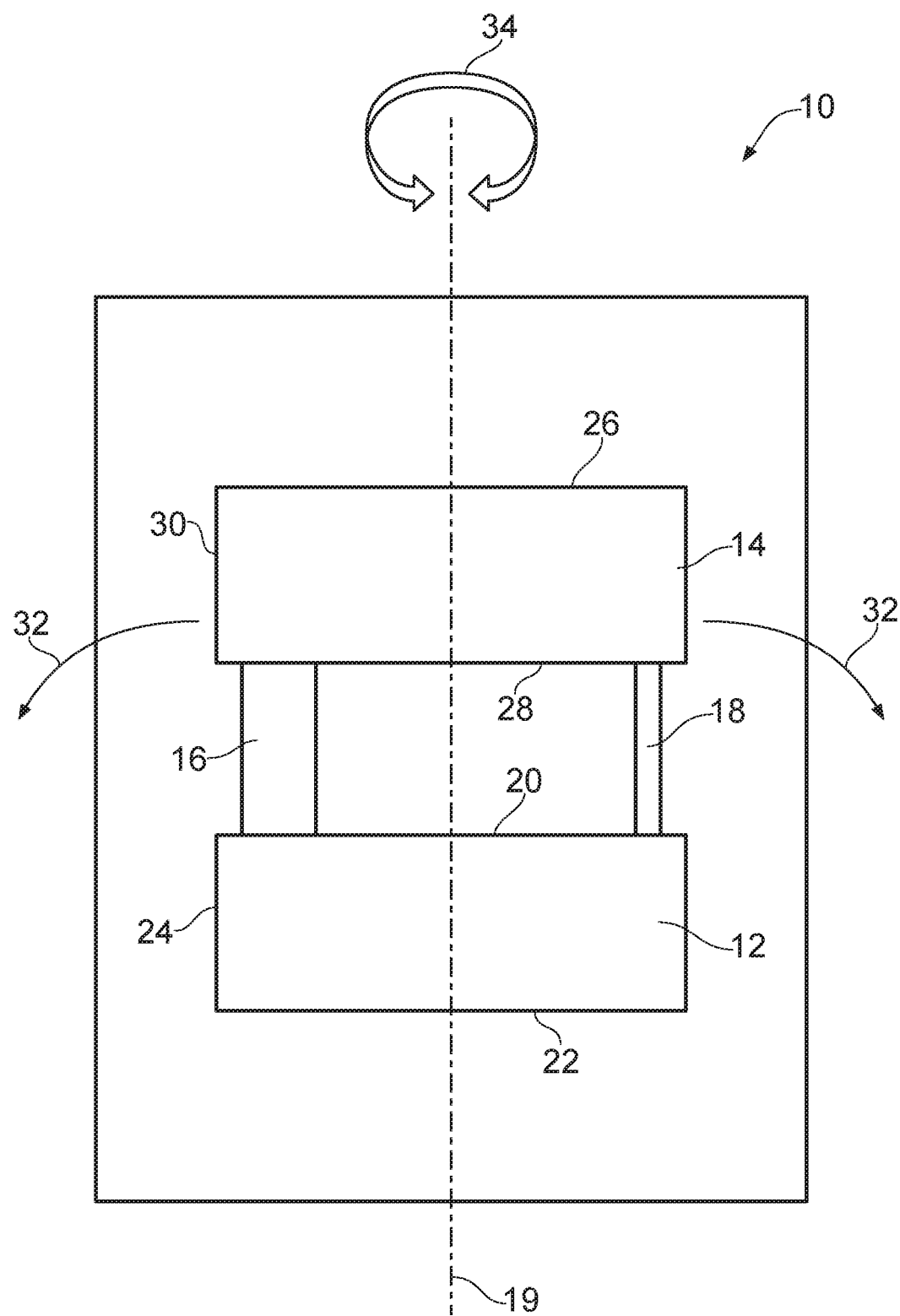
FIG. 1 illustrates a schematic diagram of a hyper redundant robot according to various examples.

FIG. 1 illustrates a schematic diagram of a hyper redundant robot 10 including a first disk 12; a second disk 14, a first joint arrangement 16, and a second joint arrangement 18. The hyper redundant robot 10 has a longitudinal axis 19. The hyper redundant robot 10 may be a continuum robot such as a "snake arm" robot, an "elephant trunk" robot, or a "snake" robot. The hyper redundant robot 10 may be used in various industries to perform one or more actions. For example, the hyper redundant robot 10 may be inserted within a gas turbine engine to inspect and/or repair the gas turbine engine. By way of another example, the hyper redundant robot 10 may be inserted into a pressurised water reactor (PWR) of a nuclear power plant to inspect and/or repair the pressurised water reactor.

In some examples, the hyper redundant robots 10, 101, 102, 103, 104 may be modules. As used herein, the wording 'module' refers to a device or apparatus where one or more features are included at a later time and, possibly, by another manufacturer or by an end user. For example, where the hyper redundant robots 10 is a module, the hyper redundant robot 10 may only include the first disk 12, the second disk 14, the first joint arrangement 16, and the second joint arrangement 18 and the remaining features (such as additional disks, additional first joint arrangements 16, additional second joint arrangements 18, control cables, an actuator for controlling the control cables, and electronic circuitry for controlling the actuator) may be added by another manufacturer, or by an end user.

The first disk 12 may have any suitable shape. For example, the first disk 12 may be circular, elliptical, square, rectangular, or have any polygonal shape when viewed in plan. Additionally, the first disk 12 may comprise any suitable material. For example, the first disk 12 may comprise a metal or a plastic. The first disk 12 includes a first surface 20, a second surface 22 and an edge 24 that extends between the first surface 20 and the second surface 22. As illustrated in FIG. 1 where the hyper redundant robot 10 is in a straight configuration, the first surface 20 and the second surface 22 are oriented perpendicular to the longitudinal axis 19, and the edge 24 is oriented parallel to the longitudinal axis 19. The first surface 20 and the second surface 22 may be planar (as illustrated in FIGS. 1, 2, 3, 6B for example) or may be non-planar (as illustrated in FIG. 4 for example).

The second disk 14 is positioned adjacent to the first disk 12. The second disk 14 may have any suitable shape and may have the same shape as the first disk 12, or may have a different shape to the first disk 12. The second disk 14 may be circular, elliptical, square, rectangular, or have any polygonal shape when viewed in plan. Additionally, the second disk 14 may comprise any suitable material. For example, the second disk 14 may comprise a metal or a plastic. The second disk 14 includes a first surface 26, a second surface 28 and an edge 30 that extends between the first surface 26 and the second surface 28. As illustrated in FIG. 1 where the hyper redundant robot 10 is in a straight configuration, the first surface 26 and the second surface 28 are oriented perpendicular to the longitudinal axis 19, and the edge 24 is oriented parallel to the longitudinal axis 19. The first surface 26 and the second surface 28 may be planar, or may be non-planar.

The first joint arrangement 16 is positioned between the first disk 12 and the second disk 14 and may include, for example, one or more hinge joints, one or more universal joints, and/or one or more spherical joints. The first joint arrangement 16 may be positioned adjacent to the edge 24 of the first disk 12 and adjacent to the edge 30 of the second disk 14. The first joint arrangement 16 may be integral with, and therefore part of, the first disk 12 or the second disk 14. In other examples, the first joint arrangement 16 may be separate to the first disk 12 and to the second disk 14.

The first disk 12 and/or the second disk 14 are in sliding contact with the first joint arrangement 16 to enable the first disk 12 and the second disk 15 to rotate relative to one another. For example, the first joint arrangement 16 may enable the second disk 14 to pivot away from the longitudinal axis 19 (for example, left and right as represented by the arrows 32 and/or to pivot into and out of the page). In some examples, the first joint arrangement 16 may enable the first disk 12 and the second disk 14 to twist relative to one another around the longitudinal axis 19 (as represented by the arrow 34).

As used herein, "sliding contact" means that the first joint arrangement 16 abuts the first surface 20 and the second surface 28 either directly (that is, there are no other components positioned between the first joint arrangement 16 and the surfaces 20, 28) or indirectly (that is, there are one or more further components positioned between the first joint arrangement 16 and the surfaces 20, 28). "Sliding contact" also means that the first joint arrangement 16, and the first surface 20 and/or the second surface 28 are movable relative to one another while remaining in abutment.

The second joint arrangement 18 is positioned between the first disk 12 and the second disk 14. In some examples, the second joint arrangement 18 may have a first end that is connected to the first surface 20 of the first disk 12, and a second end that is connected to the second surface 28 of the second disk 14 (in other words, the second joint arrangement 18 is connected to adjacent disks). In other examples, the second joint arrangement 18 may extend through the first disk 12 and/or the second disk 14 and may thus be connected to the second surface 22 of the first disk 12 and/or to the first surface 26 of the second disk 14. In some examples, the second joint arrangement 18 may extend through the first disk 12 and/or the second disk 14 and be connected to one or two further disks of the hyper redundant robot 10. The second joint arrangement 18 may have any suitable shape or shapes. For example, the second joint arrangement 18 may comprise one or more rods, one or more tubes, and/or one or more sheets.

The second joint arrangement 18 is less stiff than the first joint arrangement 16. For example, the first joint arrangement 16 may comprise a first material and the second joint arrangement 18 may comprise a second material that is different to the first material and has a lower modulus of elasticity than the first material. The first material may comprise one of: a metal; a ceramic; or a plastic, and the second material may comprise one of: rubber; a super elastic metal (such as nickel titanium); or a plastic.

Alternatively, the second material of the second joint arrangement 18 may have a higher modulus of elasticity than the first material of the first joint arrangement 16. For example, the first material may be plastic and the second material may be super elastic nickel titanium. In these examples, the second joint arrangement 18 has a smaller cross sectional area than the first joint arrangement 16 and is consequently less stiff than the first joint arrangement 16.

The hyper redundant robot 10 may provide several advantages. The stiffness of the first joint arrangement 16 may result in the hyper redundant robot 10 being relatively rigid when a force is applied along the longitudinal axis 19 and may thus be able to receive relatively high axial loads without the hyper redundant robot 10 deforming. This may enable a machine tool (such as a grinding tool or a drill) to be attached to the free end of the hyper redundant robot 10 and enable the hyper redundant robot 10 to accurately machine an article (such as an internal component of a gas turbine engine). The relatively low stiffness of the second joint arrangement 18 may result in the bending angle of the hyper redundant robot 10 being evenly distributed along the length of the hyper redundant robot 10. This may provide the hyper redundant robot 10 with improved accessibility to confined spaces since the hyper redundant robot 10 may smoothly curve around corners and obstacles.

Figure 2:
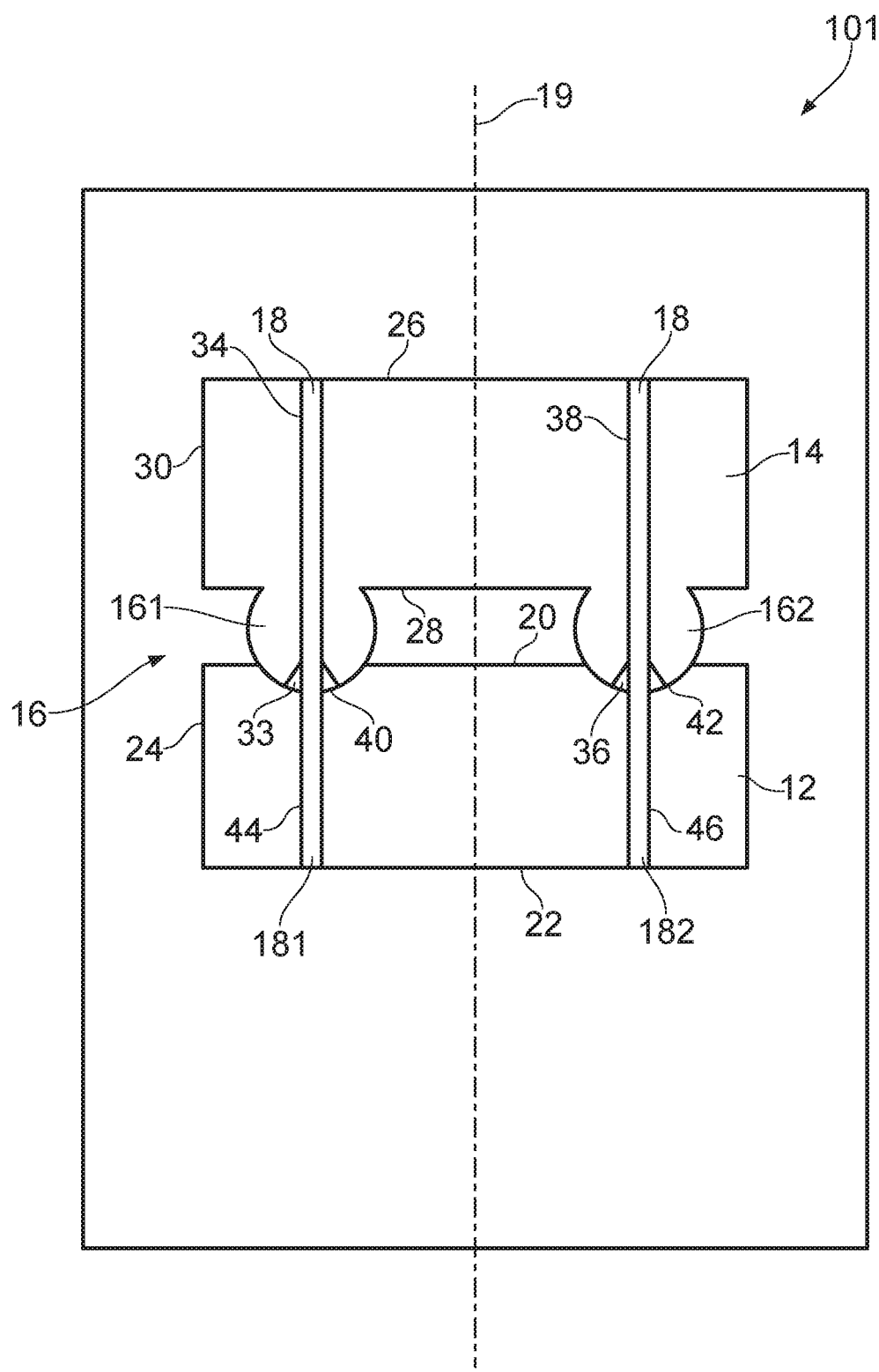
FIG. 2 illustrates a schematic side view of another hyper redundant robot according to various examples.

FIG. 2 illustrates a schematic diagram of another hyper redundant robot 101 according to various examples. The hyper redundant robot 101 is similar to the hyper redundant robot 10 illustrated in FIG. 1 and where the features are similar, the same reference numerals are used.

In this embodiment, the first joint arrangement 16 includes a first spherical joint 161 and a second spherical joint 162 that extend from the second surface 28 and are integral to the second disk 14 (that is, the first and second spherical joints are part of, and continuous with, the second disk 14). In other examples, the first and second spherical joints 161, 162 may be integral with the first disk 12, or may be separate to both the first disk 12 and the second disk 14.

The first spherical joint 161 and the second spherical joint 162 are positioned adjacent to the edge 24 of the first disk 12 and adjacent to the edge 30 of the second disk 14. The longitudinal axis 19 extends between the first spherical joint 161 and the second spherical joint 162 and consequently, the first and second spherical joints 161, 162 are on opposing sides of the first surface 20 and are on opposing sides of the second surface 28.

The first spherical joint 161 defines a cavity 33 that faces the first surface 20 of the first disk 12 (that is, the cavity 33 is defined in the surface of the first spherical joint 161 that is opposite to the second surface 28). The second disk 14 and the first spherical joint 161 define an aperture 34 that extends parallel to the longitudinal axis 19 and from the first surface 26 of the second disk 14 to the cavity 33 defined by the first spherical joint 161.

Similarly, the second spherical joint 162 defines a cavity 36 that faces the first surface 20 of the first disk 12 (that is, the cavity 36 is defined in the surface of the second spherical joint 162 that is opposite to the second surface 28). The second disk 14 and the second spherical joint 162 define an aperture 38 that extends parallel to the longitudinal axis 19 and from the first surface 26 to the cavity 36.

The first surface 20 of the first disk 12 defines a first hemispherical cavity 40 that is in sliding contact with the first spherical joint 161. The first surface 20 of the first disk 12 also defines a second hemispherical cavity 40 that is in sliding contact with the second spherical joint 162. The first disk 12 includes an aperture 44 that extends from the second surface 22 to the first surface 20 within the first hemispherical cavity 40, and an aperture 46 that extends from the second surface 22 to the first surface 20 within the second hemispherical cavity 42.

The second joint arrangement 18 includes a first flexible joint 181 and a second flexible joint 182 (where the first and second flexible joints 181, 182 are flexible relative to the first and second spherical joints 161, 162). The first flexible joint 181 extends through the apertures 34, 44 and is connected to the second surface 22 of the first disk 12 and to the first surface 26 of the second disk 14. The second flexible joint 182 extends through the apertures 38, 46 and is connected to the second surface 22 of the first disk 12 and to the first surface 26 of the second disk 14. Consequently, the first flexible joint 181 and the second flexible joint 182 are also positioned adjacent to the edge 24 of the first disk 12 and adjacent to the edge 30 of the second disk 14.

The cavities 33, 36 in the first and second spherical joints 161, 162 define a space around the first and second flexible joints 181, 182 respectively and enable the first disk 12 and the second disk 14 to rotate relative to one another (into and out of the page as illustrated in FIG. 2). The angle of maximum rotation between the first disk 12 and the second disk 14 may be increased or decreased by increasing or decreasing the space defined by the cavities 33, 36 around the first and second flexible joints 181, 182.

Figure 3:
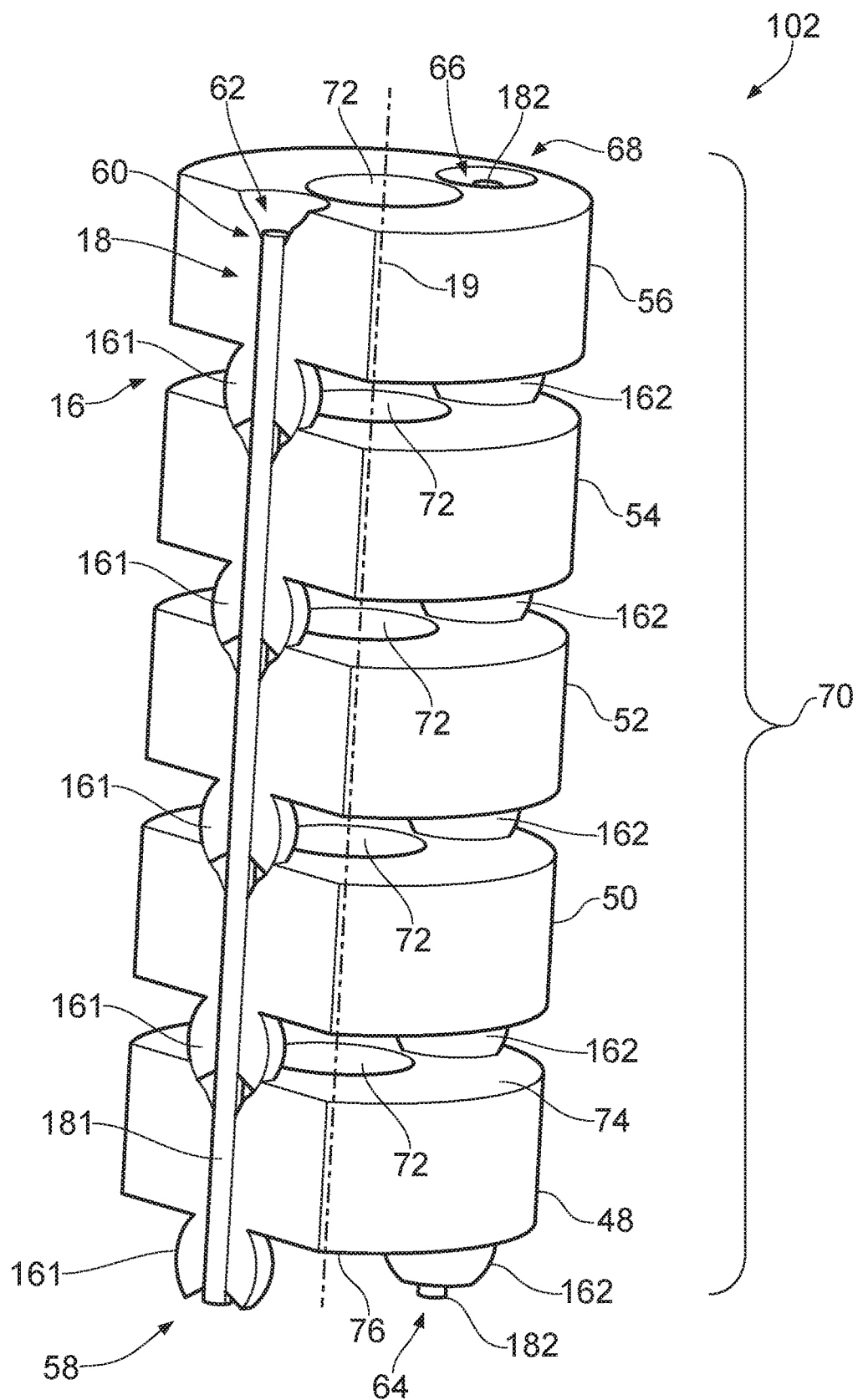
FIG. 3 illustrates a schematic cross sectional perspective view of a further hyper redundant robot according to various examples.
Figure 4:
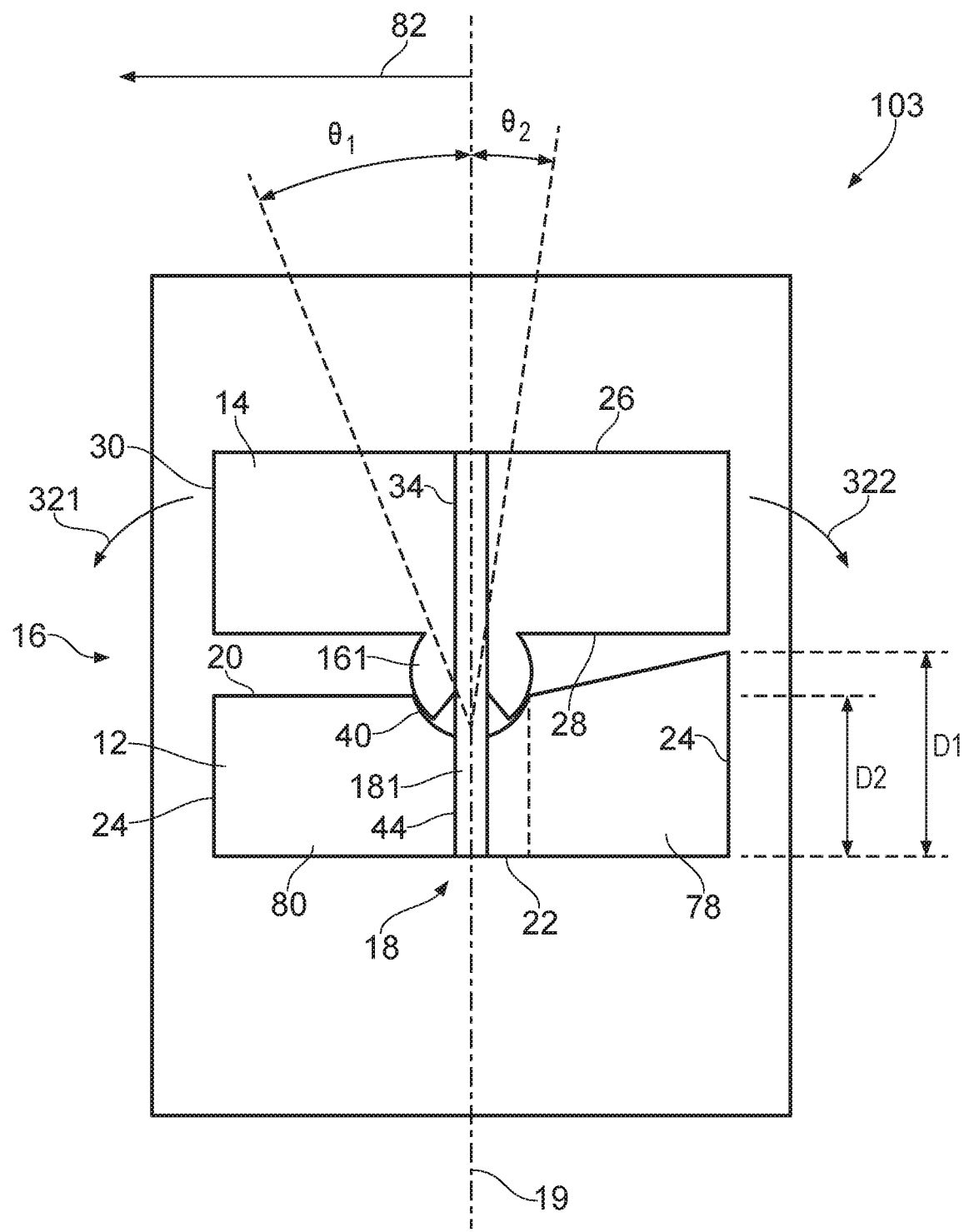
FIG. 4 illustrates a schematic side view of another hyper redundant robot according to various examples.

FIG. 3 illustrates a schematic perspective cross sectional view of a hyper redundant robot 102 according to various examples. The hyper redundant robot 102 is similar to the hyper redundant robot 101 and where the features are similar, the same reference numerals are used. The hyper redundant robot 102 differs from the hyper redundant robot 101 in that the second joint arrangement 18 extends through more than two disks and more than two spherical joints.

In more detail, the hyper redundant robot 102 includes a first disk 48, a second disk 50, a third disk 52, a fourth disk 54, a fifth disk 56, a plurality of first and second spherical joints 161, 162, a first flexible joint 181, and a second flexible joint 182.

The plurality of first and second spherical joints 161, 162 are positioned between the first, second, third, fourth and fifth disks 48, 50, 52, 54, 56 as illustrated in FIG. 2. The first flexible joint 181 extends through the first, second, third, fourth and fifth disks 48, 50, 52, 54, 56 and through the plurality of first spherical joints 161. The first flexible joint 181 is connected at a first end 58 to the first spherical joint 161 of the first disk 48, and at a second end 60 to the fifth disk 56 at the cavity 62. The second flexible joint 182 extends through the first, second, third, fourth and fifth disks 48, 50, 52, 54, 56 and through the plurality of second spherical joints 162. The second flexible joint 182 is connected at a first end 64 to the second spherical joint 162 of the first disk 48, and at a second end 66 to the fifth disk 56 at the cavity 68.

The first, second, third, fourth and fifth disks 48, 50, 52, 54, 56 may define a section 70 of the hyper redundant robot 102. A section of a hyper redundant robot may be defined as a length between two terminate segments, where a segment may be defined as the length between two adjacent disks, and the terminate segments are where the control cables are attached. In this example, a set of control cables (not illustrated to maintain the clarity of the figure) are attached to the fifth disk 56 and extend through the first, second, third, fourth and fifth disks 48, 50, 52, 54, 56.

The hyper redundant robot 102 may be advantageous in that since the first and second flexible joints 181, 182 extend between the first disk 48 and the fifth disk 56, the hyper redundant robot 102 may smoothly bend between the first disk 48 and the fifth disk 56.

The first, second, third, fourth and fifth disks 48, 50, 52, 54, 56 each define a central aperture 72 that extends between the upper surface 74 and the lower surface 76 of the first, second, third, fourth and fifth disks 48, 50, 52, 54, 56 and is oriented parallel to the longitudinal axis 19. The central apertures 72 of the first, second, third, fourth and fifth disks 48, 50, 52, 54, 56 may receive one or more components of the hyper redundant robot 102 therein. For example, one or more fibre optic cables may extend through the central apertures 72 and connect optics at the free end of the hyper redundant robot 102 with an image sensor (such as a complementary metal oxide sensor (CMOS) or a charge coupled device (CCD) sensor) at the opposite end of the hyper redundant robot 102. By way of another example, a drive cable may extend through the central apertures 72 and connect a machine tool (such as a grinding tool or a drill) at the free end of the hyper redundant robot 102 with a motor at the opposite end of the hyper redundant robot 102.

FIG. 4 illustrates a schematic side view of another hyper redundant robot 103 according to various examples. The hyper redundant robot 103 is similar to the hyper redundant robot 101 and where the features are similar, the same reference numerals are used.

The hyper redundant robot 103 differs from the hyper redundant robot 101 in that the first disk 12 of the hyper redundant robot 103 comprises a first portion 78 and a second portion 80 having different depths. The second portion 80 extends from the left hand edge 24 to the perimeters of the hemispherical cavities 40, 42 and includes the apertures 44, 46 and the hemispherical cavities 40, 42. The surface 20 of the second portion 80 is oriented perpendicular to the longitudinal axis 19. The second portion 80 has a maximum depth of D2 (measured parallel to the longitudinal axis 19 and between the first surface 20 and the second surface 22).

The first portion 78 extends from the second portion 80 at the perimeter of the hemispherical cavities 40, 42 to the right hand edge 24. The first portion 78 is generally wedge shaped and increases in depth (measured parallel to the longitudinal axis 19 and between the first surface 20 and the second surface 22) from the perimeter of the hemispherical cavities 40, 42 to the right hand edge 24. The first portion 78 has a maximum depth of D1 (measured at the right hand edge 24 of the first disk 12) at the right hand edge 24.

The maximum depth D1 of the first portion 78 is greater than the maximum depth D2 of the second portion 80. The second disk 14 may be rotated in direction 321 through an angle θ1 until the first surface 20 of the second portion 80 and the second surface 28 of the second disk 14 abut one another. The second disk 14 may also be rotated in direction 322 through an angle θ2 until the first surface 20 of the first portion 78 and the second surface 28 of the second disk 14 abut one another. The angle θ2 is less than the angle θ1 and consequently, the hyper redundant robot 103 is stiffer in direction 322 than in direction 321.

It should be appreciated that the first surface 20 of the second portion 80 may not be oriented perpendicular to the longitudinal axis 19 and may be wedge shaped and have a positive gradient (similar to the first portion 78) or have a negative gradient. The second portion 80 may therefore have a maximum depth that is greater than, or less than D2 (measured parallel to the longitudinal axis 19 and between the first surface 20 and the second surface 22).

The hyper redundant robot 103 may be advantageous in that the hyper redundant robot 103 is stiffer in direction 322 than in direction 321. This may enable the hyper redundant robot 103 to perform machining where the abutment of the first portion 78 with the second disk 14 provides a reactionary force (for example, where a machining force is applied in direction 82) at a relatively small angle of deflection of the hyper redundant robot 103.

Figure 5:
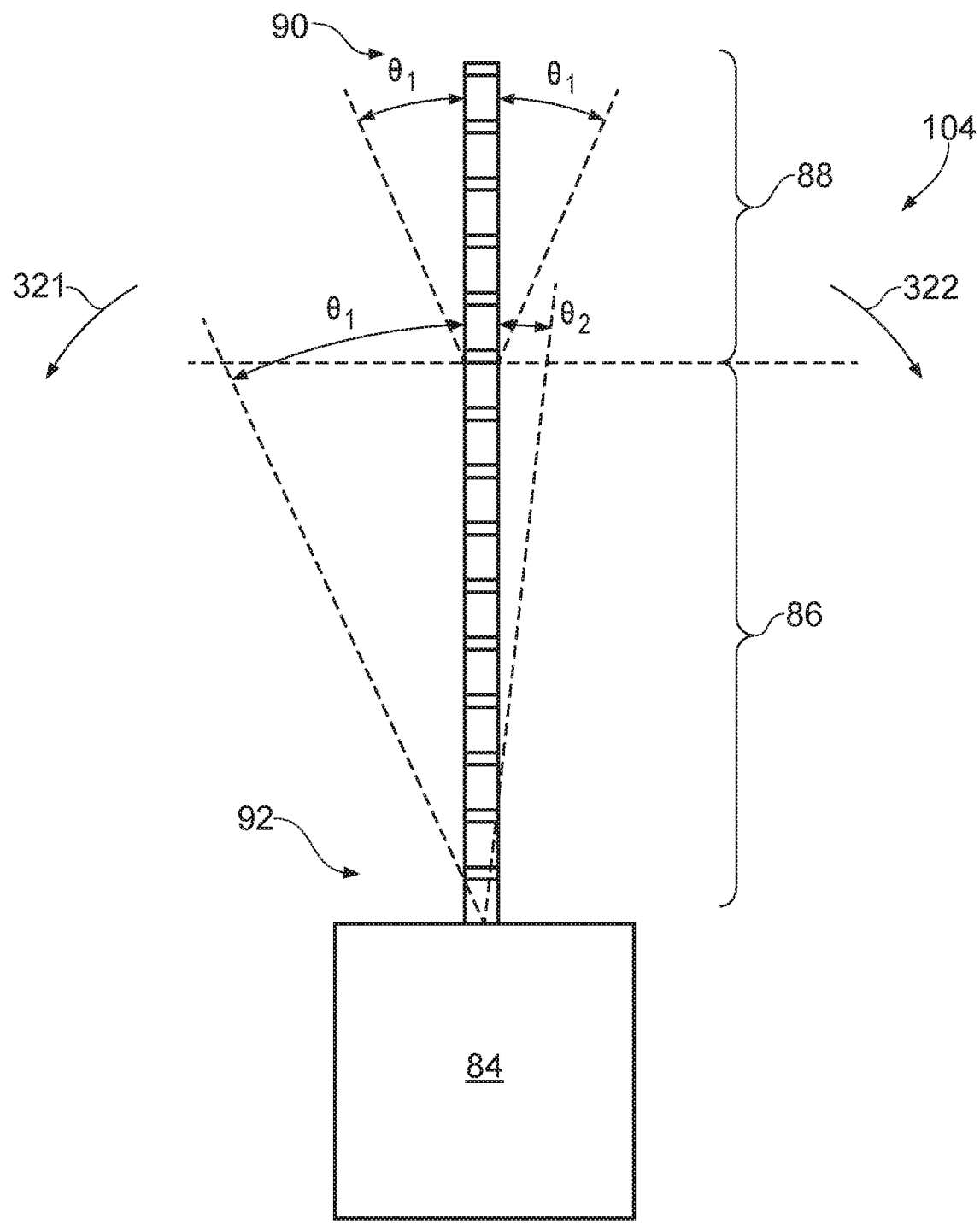
FIG. 5 illustrates a schematic side view of a further hyper redundant robot according to various examples.

FIG. 5 illustrates a schematic side view of a further hyper redundant robot 104 according to various examples. The hyper redundant robot 104 includes an actuator 84, a first plurality of disks 86 and a second plurality of disks 88. The hyper redundant robot 104 has a first free end 90 and a second end 92 that is coupled to the actuator 84.

The actuator 84 may include any mechanism that is configured to actuate the control cables that extend through (and are connected to) the first plurality of disks 86 and the second plurality of disks 88. For example, the actuator 86 may include a plurality of servomotors that are configured to actuate the control cables to rotate the plurality of disks 86, 88.

The first plurality of disks 86 are structured as illustrated in FIG. 4 and consequently, the first plurality of disks 86 each include a first portion 78 that has a greater depth than the remainder of the disk. Therefore, the first plurality of disks 86 may rotate through the angle θ1 in the direction 321, and through the angle θ2 in the direction 322. The second plurality of disks 88 may be structured as illustrated in FIGS. 2 and 3, and may rotate through the angle θ1 in the direction 321 and through the angle θ1 in the direction 322.

The hyper redundant robot 104 may be advantageous in that the segments that are closest in position to the actuator 84 may be relatively stiff in the direction 322, while the segments that are furthest in position from the actuator 84 have a greater degree of freedom and are flexible in both directions 321, 322. This may enable the hyper redundant robot 104 to be inserted within an article (such as a gas turbine engine) where the first plurality of disks 86 close to the actuator 84 are locked in position (and are therefore rigid) and the second plurality of disks 88 have greater freedom to rotate to perform an inspection and/or a repair activity.

FIG. 6A illustrates a schematic side view of a member 94 for restricting rotational movement of a hyper redundant robot 10, 101, 102, 104 according to various examples. The member 94 includes a body 96 having a first surface 97 and a second surface 98. The body 96 is wedge shaped, but may have other shapes in other examples (the body 96 may be cuboid or hemispherical in other examples). The body 96 may comprise any suitable material and may comprise, for example, plastic, metal, or rubber. The member 94 also includes an adhesive layer 99 that is coupled to the second surface 98 of the body 96.

The member 94 may be inserted between two adjacent disks to reduce or prevent rotational movement between the two disks. For example, FIG. 6B illustrates a schematic side view of the hyper redundant robot 101 illustrated in FIG. 2 and the member 94 illustrated in FIG. 6A. The member 94 is coupled to the first surface 20 via the adhesive layer 99 and consequently increases the depth of the first disk 12 at the first portion 78 from D2 to D1. The remainder of the first disk 12 (that is, the second portion 80) has a depth D2.

The maximum depth D1 of the first portion 78 and the member 94 is greater than the maximum depth D2 of the second portion 80. The second disk 14 may be rotated in direction 321 through an angle θ1 until the first surface 20 of the second portion 80 and the second surface 28 of the second disk 14 abut one another. The second disk 14 may also be rotated in direction 322 through an angle θ2 until the first surface 97 of the member 94 and the second surface 28 of the second disk 14 abut one another. The angle θ2 is less than the angle θ1 and consequently, the hyper redundant robot 103 is stiffer in direction 322 than in direction 321 when the member 94 is adhered to the first disk 12.

It should be appreciated that more than one member 94 may be inserted between two adjacent disks to reduce or prevent rotational movement between the two disks in two or more directions. For example, a first member 94 may be inserted on the right hand side of the first surface 20 (as illustrated in FIG. 6B) to reduce or prevent rotational movement to the right, and a second member may be inserted on the left hand side of the first surface 20 to prevent or reduce rotational movement to the left. The members 94 between two adjacent disks may have different depths and consequently, the angle of rotation of the two adjacent disks may be different in different directions.

The member 94 may be advantageous in that since the member 94 may be adhered to, and removed from, the hyper redundant robot 103 by an operator, it may enable an operator of the hyper redundant robot 103 to change the locking angles of the hyper redundant robot 101 in one or more directions without needing to replace one or more of the disks.

It will be understood that the invention is not limited to the embodiments above-described and various modifications and improvements can be made without departing from the concepts described herein. For example, the member 94 may be adhered to the second disk 14 instead of the first disk 12, or may be adhered to both the first disk 12 and to the second disk 14. By way of another example, the member 94 may not include the adhesive layer 99 and may instead include an alternative coupling mechanism. For example, the member 94 may be coupled to the first disk 12 or to the second disk 14 by one or more screws, one or more magnets and/or one or more clips.

Except where mutually exclusive, any of the features may be employed separately or in combination with any other features and the disclosure extends to and includes all combinations and sub-combinations of one or more features described herein.

The invention claimed is:

1. A hyper redundant robot comprising:
a first disk having a longitudinal axis, the first disk defining a first axially facing surface and defining a first edge disposed on a radially outer surface of the first disk;
a second disk sharing the longitudinal axis of the first disk, the second disk defining a second axially facing surface and defining a second edge positioned on a radially outer surface of the second disk and adjacent to the first disk, wherein the second axially facing surface axially faces the first axially facing surface;
a first joint arrangement comprising a first material and positioned between the first disk and the second disk and adjacent the first edge and the second edge, the first joint arrangement defining one or more apertures extending parallel to the longitudinal axis, the first disk and/or the second disk being in sliding contact with the first joint arrangement to enable the first disk and the second disk to rotate relative to one another; and
a second joint arrangement comprising a second material, different to the first material, and positioned between the first disk and the second disk and adjacent the first edge and the second edge, the second joint arrangement extending through the one or more apertures of the first joint arrangement, the second material having a lower modulus of elasticity than the first material to cause the second joint arrangement to be less stiff than the first joint arrangement, wherein
the first axially facing surface comprises a first portion extending from the longitudinal axis in a first radial direction toward the radially outer surface of the first disk and a second portion extending from the longitudinal axis in a second, opposite radial direction toward the radially outer surface of the first disk,
the first portion is spaced from the second axially facing surface at the radially outer surface of the first disk by a first distance, and the second portion is spaced from the second axially facing surface at the radially outer surface of the first disk by a second distance greater than the first distance, and
the first portion of the first axially facing surface is inclined relative to the second axially facing surface such that the first portion is spaced from the second axially facing surface at the radially outer surface of the first disk by the first distance and is spaced from the second axially facing surface radially inward of the radially outer surface by the second distance.

2. A hyper redundant robot as claimed in claim 1, wherein the first material comprises one of: a metal; a ceramic; or a plastic, and wherein the second material comprises one of: rubber; a super elastic metal; or a plastic.

3. A hyper redundant robot as claimed in claim 1, wherein the first disk defines a first aperture extending parallel to the longitudinal axis and the second disk defines a second aperture extending parallel to the longitudinal axis.

4. A hyper redundant robot as claimed in claim 1, wherein a depth of the first disk at the first portion is greater than a depth of a remainder of the first disk to reduce the extent of rotational movement between the first disk and the second disk in the first radial direction.

5. A hyper redundant robot as claimed in claim 4, further comprising:
a third disk; and
a fourth disk positioned adjacent to the third disk, the third and fourth disks each having a constant depth.

6. A hyper redundant robot as claimed in claim 5, wherein the hyper redundant robot has a first free end and a second end coupled to an actuator, the first disk and the second disk being positioned in closer proximity to the second end than the third disk and the fourth disk.

7. A hyper redundant robot as claimed in claim 1, wherein the first disk and the second disk define a distance there between along the longitudinal axis, the hyper redundant robot further comprising a member defining a surface including an adhesive for coupling the member to the first disk or to the second disk to reduce the extent of rotational movement between the first disk and the second disk in a direction, the depth of the member being equal to or less than the distance between the first disk and the second disk.

8. A hyper redundant robot as claimed in claim 1, further including
a plurality of disks including
a first distal end and a second, opposite distal end;
the first disk; and
the second disk,
wherein:
the second joint arrangement includes a first joint end and a second joint end, the first joint end being connected to the first disk at the first distal end of the plurality of disks, and the second joint end being connected to the second distal end of the plurality of disks.

9. A hyper redundant robot as claimed in claim 1, wherein the first disk defines a third axially facing surface facing away from the second disk, and
a first axial thickness between the first portion and the third axially facing surface at the radially outer surface is greater than a second axial thickness between the second portion and the third axially facing surface at the radially outer surface.

10. A hyper redundant robot as claimed in claim 1, further comprising
a first plurality of disks including the first disk and the second disk; and
a second plurality of disks including:
a third disk; and
a fourth disk positioned adjacent to the third disk, the third and fourth disks each having a constant axial thickness.

11. A hyper redundant robot as claimed in claim 10, wherein a first number of disks of the first plurality of disks is greater than a second number of disks of the second plurality of disks.

* * * * *